United States Patent
Lee (10) Patent No.: US 11,681,426 B2
(45) Date of Patent: Jun. 20, 2023

(54) METHOD AND PROGRAM FOR PRODUCING MULTI REACTIVE VIDEO, AND GENERATE META DATA TO MAKE MULTI REACTIVE VIDEO, AND ANALYZE INTO INTERACTION DATA TO UNDERSTAND HUMAN ACT

(71) Applicant: Chui Woo Lee, Seoul (KR)

(72) Inventor: Chui Woo Lee, Seoul (KR)

(73) Assignee: Momenti, Inc., New York City, NY (US)

( * ) Notice: Subject to any disclaimer, the term of this patent is extended or adjusted under 35 U.S.C. 154(b) by 0 days.

(21) Appl. No.: 17/508,506

(22) Filed: Oct. 22, 2021

(65) Prior Publication Data
US 2022/0107724 A1 Apr. 7, 2022

Related U.S. Application Data

(63) Continuation of application No. PCT/KR2020/005493, filed on Apr. 27, 2020.

(30) Foreign Application Priority Data

Apr. 26, 2019 (KR) .................. 10-2019-0049071
Apr. 27, 2020 (KR) .................. 10-2020-0050470

(51) Int. Cl.
*G06F 3/04847* (2022.01)
*H04N 19/70* (2014.01)
(Continued)

(52) U.S. Cl.
CPC ...... *G06F 3/04847* (2013.01); *G06F 3/04883* (2013.01); *G06F 16/743* (2019.01); *G06V 20/46* (2022.01); *H04N 19/70* (2014.11)

(58) Field of Classification Search
CPC ............. G06F 3/04847; G06F 3/04883; G06F 16/743; G06V 20/46; H04N 19/70
See application file for complete search history.

(56) References Cited

U.S. PATENT DOCUMENTS 5,675,384 A * 10/1997 Ramamurthy ....... H04N 19/126
375/E7.277
10,079,977 B2 9/2018 Cho et al.
(Continued)

FOREIGN PATENT DOCUMENTS

KR 10-2001-0094611 A 11/2001
KR 10-0681833 B1 2/2007
(Continued)

OTHER PUBLICATIONS

International Search Report issued in PCT/KR2020/005493; dated Sep. 11, 2020.
(Continued)

*Primary Examiner* — Seth A Silverman
(74) *Attorney, Agent, or Firm* — Studebaker & Brackett PC (57) ABSTRACT

Disclosed is a multi-reactive video generating method and program that performs various condition playbacks depending on a user's manipulation, based on a video database (e.g., a basic video) in which a general video or a plurality of image frames are stored. According to an embodiment of the inventive concept, various actions (i.e., reactions) may be applied as the multi-reactive video generation file is played with a general video or a combination of a plurality of image frames.

16 Claims, 5 Drawing Sheets

(51) Int. Cl.
*G06F 16/74* (2019.01)
*G06V 20/40* (2022.01)
*G06F 3/04883* (2022.01)

(56) References Cited

U.S. PATENT DOCUMENTS

2014/0105463 A1* 4/2014 Wang ................... G06T 7/269
                                                    382/103
2018/0182435 A1   6/2018 Lee
2018/0300534 A1* 10/2018 Elor .................. G06V 40/176
2018/0300851 A1* 10/2018 Elor .................. G06T 3/0093
2020/0105305 A1   4/2020 Lee

FOREIGN PATENT DOCUMENTS

KR   10-2017-0020269 A   2/2017
KR   10-2018-0039321 A   4/2018

OTHER PUBLICATIONS

The extended European search report issued by the European Patent Office dated Jan. 4, 2023, which corresponds to European Patent Application No. 20794960.3-1208 and is related to U.S. Appl. No. 17/508,506.

An Office Action mailed by the Indian Patent Office dated Dec. 16, 2022, which corresponds to Indian Patent Application No. 202127054531 and is related to U.S. Appl. No. 17/508,506.

* cited by examiner

METHOD AND PROGRAM FOR PRODUCING MULTI REACTIVE VIDEO, AND GENERATE META DATA TO MAKE MULTI REACTIVE VIDEO, AND ANALYZE INTO INTERACTION DATA TO UNDERSTAND HUMAN ACT

CROSS-REFERENCE TO RELATED APPLICATIONS

The present application is a continuation of International Patent Application No. PCT/KR2020/005493, filed on Apr. 27, 2020, which is based upon and claims the benefit of priority to Korean Patent Application Nos. 10-2019-0049071, filed on Apr. 26, 2019 and 10-2020-0050470, filed on Apr. 27, 2020. The disclosures of the above-listed applications are hereby incorporated by reference herein in their entirety.

BACKGROUND

Embodiments of the inventive concept described herein relate to a multi-reactive video producing method, a multi-reactive video meta data generating method, an interactive data analyzing method for understanding human act, and a program using the same, and more particularly, relate to a method and program for producing a multi-reactive video that responds to a user's manipulation.

Recently, a technology for capturing an image has been developed dramatically. Not only camcorders and digital cameras, but also mobile terminals such as smart phones may also capture high resolution images. Furthermore, a 360-degree camera, a 3D image camera and the like are emerging.

The image is captured by an image capturing device and stored in a specific format, and played by a playable terminal Image playback is provided unilaterally in chronological order without interaction with viewers. In other words, the viewers may sense only the visual feeling through playing images.

SUMMARY

Embodiments of the inventive concept provide a multi-reactive video producing method that performs various condition playbacks depending on a user's manipulation, based on a video database (e.g., a basic video) in which a general video or a plurality of image frames are stored.

Embodiments of the inventive concept provide a method for providing an output video responsive to a plurality of input manipulations based on a plurality of basic videos and generating a multi-reactive video while the capacity of the output video is reduced through compression.

Embodiments of the inventive concept provide a method of generating and using a multi-reactive video that is capable of generating various output images through separate manipulation or simultaneous manipulation together with a plurality of input manipulations.

Embodiments of the inventive concept provide a method and program for implementing a multi-reactive video generation file that provides a multi-reactive video generation file for implementing multi-reactive video to which various functions are applied by applying specific conditions to a general video or a 2D or 3D video database.

Embodiments of the inventive concept provide a multi-reactive video-based user interest analyzing method that calculates a user's interest in an object in an image in response to the obtained multi-reactive video manipulation of a user.

Embodiments of the inventive concept provide a multi-reactive video generating method that generates a multi-reactive data structure that allows a user to adjust a direction or sequence of an output video by adding an event axis within a video (e.g., adding controlling a video in units of events) to overcome the limitation of content that has previously limited to playing a video in chronological order.

Problems to be solved by the inventive concept are not limited to the problems mentioned above, and other problems not mentioned will be clearly understood by those skilled in the art from the following description.

According to an embodiment, a multi-reactive video generating method includes obtaining, by a computer, a basic video, the basic video being an original video including a movement of an object to be reactively implemented depending on manipulation of a user, generating, by the computer, a compressed video based on the basic video, the compressed video including only a movement of an object to be reactively implemented depending on the manipulation of the user, receiving, by the computer, a multi-reactive video generation condition, the multi-reactive video generation condition being a plurality of manipulation inputs corresponding to reactions capable of being generated in the compressed video, and generating a multi-reactive video by applying the generation condition to the compressed video.

Furthermore, in another embodiment, the generating of the compressed video includes deleting an image frame, which is not implemented reactively, from the basic video by dividing a video section or recognizing a similarity between image frames.

Moreover, in another embodiment, the generating of the compressed video includes storing, by the computer, a redundant section video included in one of the first basic video and the second basic video by extracting a section video including a movement of a same path from the first basic video and the second basic video when a first basic video and a second basic video, which include the same object as each other, include a movement for a path having the same object.

Besides, in another embodiment, the generating of the compressed video includes storing, by the computer only the first section video in the compressed video and setting the first section video to be played in a reverse direction when a user manipulation of generating a movement of the object from the second location to the first location is entered, when the basic video includes a first section video indicating a movement from a first location to a second location and a second section video indicating a movement from the second location to the first location.

Also, in another embodiment, the generating of the compressed video includes setting a first playback type, in which the first event section is played in a forward direction and then the second event section is continuously played, and a second playback type, in which the first event section is played in the forward direction and then is played in a reverse direction, when the basic video includes a first event section and a second event section, which have appearance changes different from each other before and after a specific reference time point. The receiving of the multi-reactive video generation condition includes connecting the first playback type to the second playback type by dividing a same user manipulation type into a first manipulation and a second manipulation based on specific reference manipulation intensity, a reference movement length, a reference manipulation speed, or a reference manipulation time length.

In addition, in another embodiment, the generating of the compressed video includes extracting, by the computer, the background region from the basic video or the section video and including the background region within only the basic video or an initial frame of the section video and then storing only one or more extraction regions in an image frame, when a background region in which a change does not occur is included in a plurality of image frames included in the entire basic video or a specific section video within the basic video. The extraction regions are regions in which a change in an object movement occurs in the basic video.

Furthermore, in another embodiment, the generating of the compressed video includes sequentially accumulating, by the computer, an extraction region of each image frame, which is implemented reactively, at each location in a stack structure from an initial frame including both the background region and the extraction regions and generating a compressed video file. The generating the multi-reactive video includes connecting and storing a user manipulation to each extraction region on the stack structure.

Moreover, in another embodiment, when an extraction region stack is formed in a plurality of regions within an image frame, the multi-reactive video is output by simultaneously extracting a plurality of extraction regions according to a plurality of user manipulations thus input and combining the extracted plurality of extraction regions with the background region.

Besides, in another embodiment, the generating the multi-reactive video includes setting a specific section video within the compressed video to be output in a specific playback method when a specific reactive generation condition is satisfied by a user manipulation.

Also, in another embodiment, the generating the multi-reactive video includes connecting a plurality of multi-reactive videos such that a change in a second multi-reactive video is output depending on a user manipulation entered into a first multi-reactive video. The first multi-reactive video and the second multi-reactive video are set to be simultaneously output on a screen.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, preferred embodiments of the inventive concept will be described in detail with reference to the accompanying drawings. The above and other aspects, features and advantages of the inventive concept will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms used herein are provided to describe the embodiments but not to limit the inventive concept. In the specification, the singular forms include plural forms unless particularly mentioned. The terms "comprises" and/or "comprising" used herein do not exclude the presence or addition of one or more other components, in addition to the aforementioned components.

In this specification, a 'multi-reactive video' refers to a video that is changed or played in response to a specific input manipulation of a user (i.e., a viewer) who watches a video. For example, the 'multi-reactive video' may mean a video played as if an object in the video is moving in response to a user's manipulation as the user's input manipulation corresponding to the specific movement of an original video is connected.

In this specification, a 'computer' includes all the various devices capable of performing arithmetic processing. For example, the computer may correspond to not only a desktop personal computer (PC) or a notebook but also a smart phone, a tablet PC, a cellular phone, a personal communication service (PCS) phone, a mobile terminal of a synchronous/asynchronous International Mobile Telecommunication-2000 (IMT-2000), a palm PC, a personal digital assistant (PDA), and the like. Furthermore, the computer may correspond to a server computer that receives information from a client. Hereinafter, in this specification, the computer may be represented as a terminal.

In this specification, an 'input manipulation' refers to a manipulation to an image of the user received through an input means of the computer playing a multi-reactive video. For example, the input manipulation may include manipulation (e.g., click manipulation, drag manipulation, contact touch manipulation, force touch manipulation (i.e., click manipulation, drag manipulation, contact touch manipulation during a specific time or more, force touch manipulation (i.e., a touch manipulation that applies a specific pressure to a touch screen or touch pad) or the like) that may be entered into a specific point or region in an image, via an input means such as a mouse or touch screen. Moreover, for example, the input manipulation may include the arrangement state or movement of a terminal itself, which may be obtained by using a sensor (e.g., an acceleration sensor, a gyro sensor, or the like) provided in a computer (or a terminal).

In this specification, an 'object' means an object to be manipulated by the user. For example, for an image from capturing an operation in which the user's hand touches a specific object, the object refers to an object touched by the user. Furthermore, for a video indicating that a movement of a specific person is captured, the object may be a person in the video.

In this specification, the 'manipulation object' means a subject manipulates an object in a video. For example, when touching or pressing a bag or pillow in an image by using a hand, the manipulation object means the hand touching the bag or pillow.

In this specification, a 'basic video' means a video that is not implemented reactively. That is, the basic video corresponds to a video generated in a general capture method or a combination of a plurality of image frames, in which image frames are stored for each object location in space.

In this specification, a 'compressed video' refers to a video compressed in a minimum movement unit to implement the basic video as a reactive video. For example, when the same movement is repeatedly included in the basic video, the compressed video is obtained by storing a video corresponding to only one movement after repeated movements are deleted. Besides, for example, when the basic video includes both a movement from a first location to a second location and a movement from the second location to the first location, the basic video having the movement from the first location to the second location may be stored in the compressed video, and the movement from the second location to the first location may be implemented through playing the basic video in reverse.

In this specification, a 'multi-reactive video generation file' is generated by compressing a plurality of basic videos; and the 'multi-reactive video generation file' is a video file for playing a plurality of operations depending on a user's manipulation, or is metadata capable of being implemented as a multi-reactive video as the multi-reactive video generation file is played together with one or more basic videos.

Hereinafter, a multi-reactive video generating method according to an embodiment of the inventive concept will be described with reference to drawings.

Figure 1:
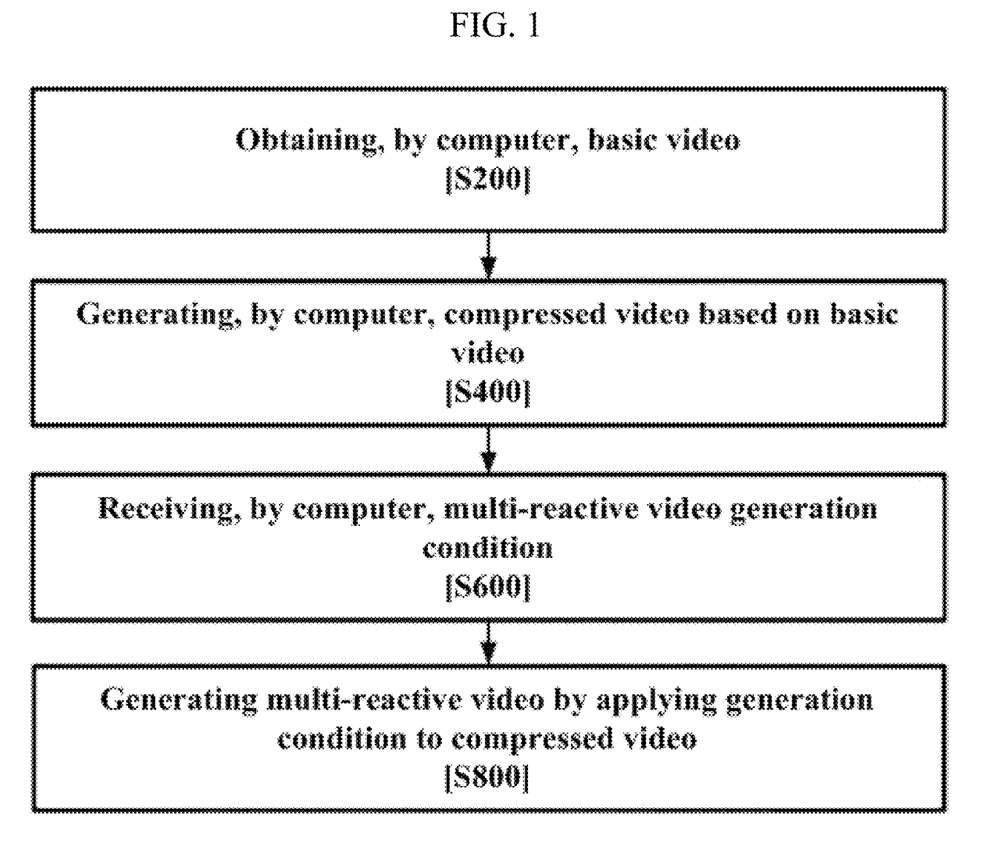
FIG. 1 is a flowchart of a method for generating a multi-reactive video, according to an embodiment of the inventive concept.

FIG. 1 is a flowchart of a method for generating a multi-reactive video, according to an embodiment of the inventive concept.

A computer obtains a basic video (S200). The basic video is an original video including the movement of an object to be reactively implemented depending on a user's manipulation.

The computer may load a basic video, which is already generated and stored, or may generate the basic video (i.e., the computer launches a program or application including a multi-reactive video generation function, and then activates a camera function through the corresponding program or application to capture a basic video immediately) by obtaining image frames in real time.

A reactive video creator (e.g., a content provider or individual user) captures a video including an operation to be implemented reactively.

In the detailed embodiment, the computer may obtain a video for a plurality of movements of the same object from a user and then may generate a multi-reactive video. For example, when an object is the user's hand, the computer obtains a plurality of images indicating that the user's index finger moves or bends in various directions while the user spreads out his/her index finger.

Figure 2:
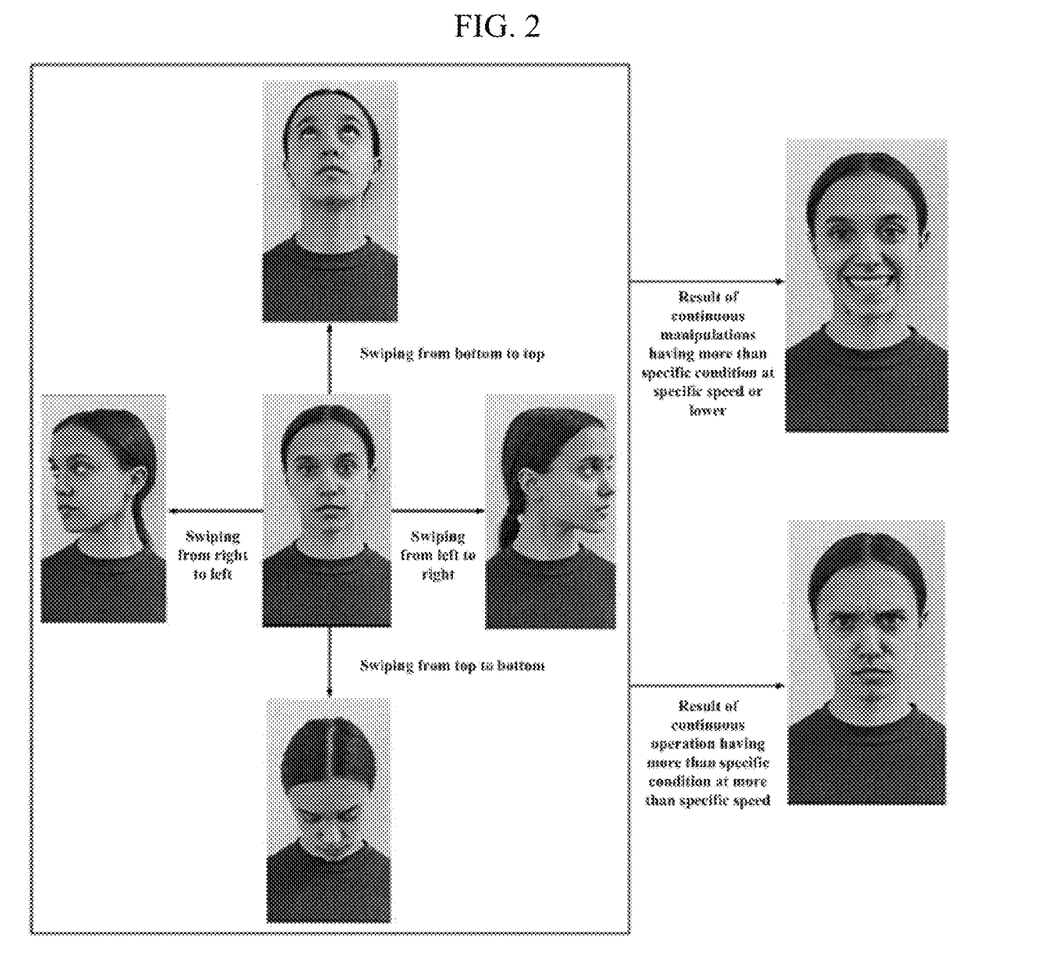
FIG. 2 is an exemplary view for providing a change in a head direction and facial expression of a face that is an object depending on a user's manipulation, according to an embodiment of the inventive concept.

Also, for example, as illustrated in FIG. 2, when the user desires to produce a reactive video indicating that the user's head is rotated vertically or horizontally or the user's facial expression is changed in response to a specific manipulation, the user captures a video including all of the desired head movement and facial expressions.

In addition, when a reactive video indicating that a water balloon bursts or pops up from a floor is generated depending on the manipulation entered by the user, the user sequentially captures a first video indicating that a water balloon is dropped and then bursts, and a second image indicating that a water balloon having a color and size the same as the burst water balloon bounces without bursting.

Figure 3:
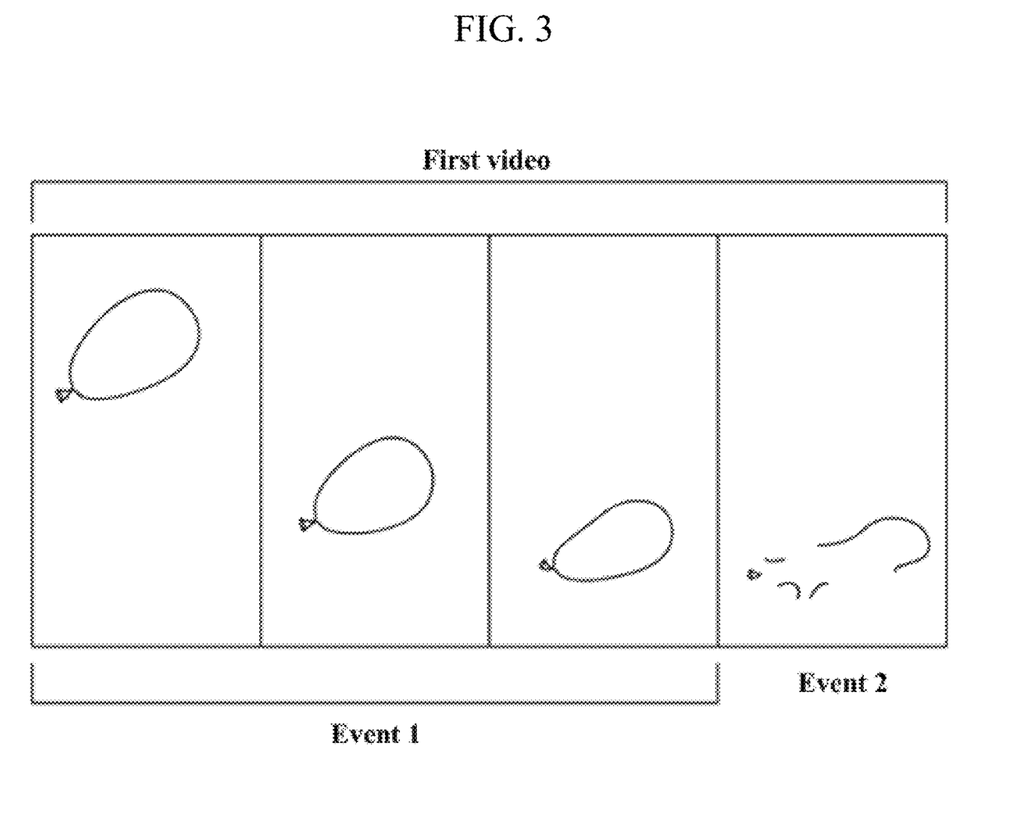
FIG. 3 is an exemplary diagram of a basic video including a plurality of events such that different results is capable of being implemented in response to manipulation entered by a user, according to an embodiment of the inventive concept.

Moreover, the computer obtains one basic video indicating that different events occur after a specific movement is performed, not repeating the existing movement. That is, the computer obtains a video indicating that a plurality of events of an object occur, as a basic video. For example, as illustrated in FIG. 3, the computer obtains a basic video including an event (a first event) of the movement indicating that a water balloon moves downward and an event (a second event) indicating that a water balloon collides with a floor and then bursts. Also, for example, the computer obtains, as the basic video, a video including an event (a first event) indicating that a branch is bent and an event (a second event) indicating that a branch is broken. In addition, the computer obtains, as the basic video, a video including an event (a first event) indicating that an air-filled balloon is dented as the balloon is pressed and an event (a second event) indicating that the balloon bursts as the balloon is pressed.

Figure 4:
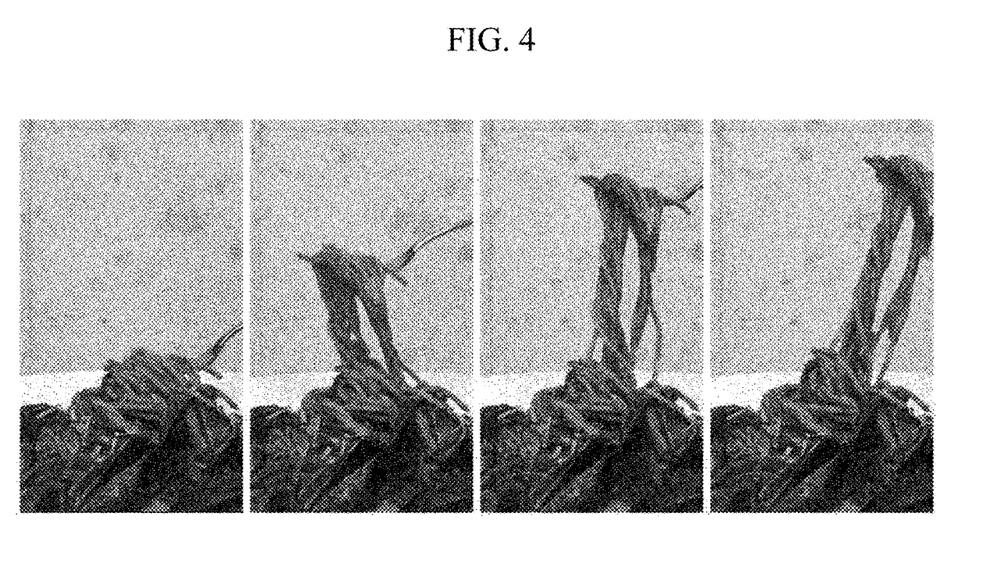
FIG. 4 is an exemplary diagram of a basic video for implementing an object location change according to each touch manipulation location of a user, according to an embodiment of the inventive concept.

Furthermore, as illustrated in FIG. 4, when the user desires to implement a reactive video for implementing an operation of lifting pasta in a bowl in a plurality of directions at a plurality of heights, the computer captures a video indicating that the user repeatedly lifts the pasta or moves the pasta in a bowl to a plurality of locations in the 3D space.

In addition, the computer may obtain a video indicating that an object is deformed by using a manipulation object, and then may store the video obtained by deleting the manipulation object, as a basic video.

The computer generates a compressed video based on the basic video (S400; a compressed video generating step). The compressed video includes only the movement of an object to be implemented reactively depending on the user's manipulation.

Hereinafter, the detailed description of a method of generating a compressed video will be described.

In an embodiment, the computer deletes an unnecessary video section in a process of implementing a reactive video in the basic video. For example, when the user captures a plurality of movements of an object to implement a multi-reactive video, the basic video may include image frames that will not be implemented reactively between first movement acquisition and second movement acquisition. The computer may separate and delete a video section that is not to be implemented reactively.

For example, the computer may recognize the entire frames included in the basic video, may automatically separate frames having a large similarity difference of an object movement, which are to be deleted, and may delete the frames having the large similarity difference. In addition, for example, the computer may automatically divide the basic video into a plurality of sections. Afterward, the user may select a video section that is not implemented reactively, and then the computer may delete the selected video section. As a specific example, the computer may separate the video section in the basic video in an object movement unit (e.g., a head movement to the right, a head movement to the left, or the like) and then may delete a video section between a plurality of object movement units.

Furthermore, in another embodiment, when a plurality of movement videos included in the basic video includes a redundant video, the computer may delete redundant sections. For example, when fingers within a first basic video, a second basic video, and a third basic video move in different directions in a state where the fingers are positioned at the same finger location, the computer stores only one image frame positioned at the same location. Afterward, when the same movement is maintained in the first basic video and the second basic video, and a plurality of movements are performed in the third basic video, the computer stores only one frame at the corresponding time point of the first basic video and the second basic video, and separately stores the frame for the third basic video.

Also, for example, for the first basic video and the second basic video, in which different results are implemented after the same movement of an object is generated (e.g., when results are different depending on a speed difference after a fall, in a plurality of images indicating that a balloon is dropped to a floor), the computer may store only one section in which the object moves on the same path, and, the computer may store only the sections corresponding to the reaction results of the first basic video and the second basic video, as a result. To this end, the computer may compare the first basic video and the second basic video, may separate sections having the same object movement, may store only one redundant section, and may store a redundant video section, a first result video, and a second result video separately. Furthermore, for example, when an object repeatedly moves in the same section within the entire basic video (e.g., when a head turns to the left and right), a first section video indicating that the head returns to the front after the head faces the left in a state where the head is facing the front, and a second section video indicating that the head returns to the front after the head faces the right in a state where the head is facing the front are repeated. Accordingly, the computer removes a portion overlapping the first section video and a portion overlapping the second section video.

Moreover, for example, when the head moves from the first location to the second location and then returns to the first location, the computer may store only the first section video indicating the head moves from the first location to the second location and may delete and compress the second section video indicating that the head returns from the second location to the first location. Because the second section video may be implemented by playing the first section video in reverse, the computer deletes the second section video and stores only the first section video in the compressed video. For example, when a person who is an object in the basic video looks at the front, turns his/her head to the left, and then returns to the front, the computer may store only the first section video indicating that the person faces the left at the front. To this end, the computer searches for a portion in the basic video where the object repeatedly moves on the same path, divides a video based on a frame (e.g., a frame in which a change from a movement in a first direction to a movement in a second direction is started) where a movement direction starts to be changed, and stores only the first section video.

Also, the computer may perform a specific movement and then may generate a compressed video obtained by dividing one basic video (e.g., a video indicating that a water balloon is dropped in the air and then is exploded) indicating that different events occur, not repeating a section of the existing movement, into a plurality of events and storing the divided results.

In detail, when the basic video includes a first event section and a second event section, which have appearance changes of the object different from each other before and after a specific reference time point, the compressed video generating step sets a first playback type, in which the first event section is played in the forward direction and then the second event section is continuously played, and a second playback type, in which the first event section is played in the forward direction and then is played in a reverse direction. In the multi-reactive video generation condition receiving step to be described later, the first playback type and the second playback type may be connected by dividing the same user manipulation type into a first manipulation and a second manipulation based on specific reference manipulation intensity, a reference movement length (i.e., a length of swiping manipulation on a touch display), a reference manipulation speed, or a reference manipulation time length (i.e., a time length during which a touch manipulation is continuously applied to a specific location).

Hereinafter, a method in which a computer generates a compressed video for implementing a reactive video by using one basic video including a plurality of events will be described in detail.

When a reactive video indicating that a water balloon bursts or pops up from a floor depending on the manipulation entered by the user is generated, the computer may capture only the first video indicating that a user drops the water balloon and then the water balloon pops up, may divide a first video corresponding to one event into a first event section and a second event section, and may generate a first playback that play only the first event section in the forward direction and then performs reverse playback and a second playback that plays the first event section in the forward direction and then plays the first event section. The computer may connect the first playback and the second playback to different user manipulations, respectively such that the first playback and the second playback may be performed in response to a user manipulation entered by the user.

For example, as illustrated in FIG. 3, when a video indicating that a water balloon is dropped and then bursts is used as a basic video, the computer obtains a reference time point before the water balloon is dropped and bursts, and separates the first event section and the second event section based on the reference time point. The computer may receive the reference time point from a user who generates a reactive video or may automatically calculate the reference time point through a deep learning-trained learning model. For example, the computer may automatically recognize the reference time point through a learning model for searching for a time point at which the appearance of an object is deformed by a reference value or more. As such, the computer may implement the first playback that plays the first event section in the reverse direction after playing, in the forward direction, the first event section where a water balloon falls depending on a first user manipulation (e.g., a weak swiping manipulation that moves an object, which is a water balloon, at a specific reference speed or less), and the second playback that plays, in the forward direction, the first event section where the water balloon falls depending on a second user manipulation (e.g., a strong swiping manipulation that moves an object, which is a water balloon, at more than a specific reference speed) and then plays the second event section continuously.

Moreover, even when an object is dropped at a specific reference speed or less, the computer may classify different events depending on a speed corresponding to the user's swiping manipulation. For example, as described below, after a user manipulation is connected in a movement direction of the water balloon, the computer may set a start point of reverse playback of the first event section depending on the intensity of a touch manipulation. Because a difference in the degree of deformation of the balloon after the balloon touches the floor is present depending on a speed at which the balloon falls, the computer may start reverse playback after playing the video until a time point at which a division criterion associated with the second event is long from the reference time point as the strength of user manipulation decreases.

Also, as another example, when a video indicating that a branch is pulled and bent and then is broken is used as a basic video, the computer sets a time point, at which the branch is broken, as the reference time point, and then divides the video into a first event section and a second event section. The reference time point may be set by being entered by a user creating a reactive video; alternatively, the reference time point may also be set by automatically calculating a time point at which a change (i.e., a change in which a branch is broken) in an object appearance occurs by the reference value or more. In addition, as a forward playback and a reverse playback are performed on the first event, the central location in a movement of the first event section is set to correspond to a start time point of the compressed video to generate a video indicating that a branch is realistically shaken at a location higher than a location where the movement is started. The start time point may be set by the user generating a reactive video. The computer may calculate a path on which an object moves in the basic video, and then may also set a frame, which corresponds to a central location of the path, as the start time point. Besides, after the forward playback is performed from the start time point depending on a level (e.g., a length of a swiping manipulation entered on a touch display) of a user manipulation entered by the user within a first event section, a time point at which the reverse playback is started may be set differently.

As such, the computer may generate a compressed video capable of implementing a reactive video for generating various reactions depending on a user manipulation, by using one basic video. The computer may implement the first playback type that plays the first event section in the forward direction from a start time point and then continuously plays the second event section after a reference time point. Furthermore, a computer may implement the second playback type that performs the forward playback from a start time point in the first event section to a first specific stop time point, performs the reverse playback up to the start time point, performs reverse playback from the start time point to the second stop time point in a direction of the initial time point of the basic video, and proceeds to forward playback again to the start time point. As the computer repeats a playback that allows the first stop time point and the second stop time point gradually to approach the start time point during the second playback, the computer may implement a realistic reactive video indicating that a branch vibrates and then the vibration of the branch is stopped while the amplitude of the vibration is reduced.

The second stop time point is set to correspond to a first stop time point. For example, the time point of the image frame, at which an object falls from the start location in a direction of the initial location in an initial video by the same value as a difference between an object location (hereinafter, a start location) on a frame at a start time point and an object location at a first stop time point or by a value reduced depending on a specific ratio, is set as a second stop time point.

Also, the computer may divide a detailed playback type (e.g., a (2-1)-st playback type, a (2-2)-nd playback type, or the like) depending on a location at the first stop time point in the second playback type. In other words, an extent to which an object vibrates after being changed in a forward direction from the reference location of the object may be divided into sub-types.

As described below, the computer may connect different user manipulations to the first playback type and the second playback type. For example, when the computer connects a user manipulation of swiping an object, the computer may connect the first playback type to a swiping manipulation having more than a specific standard speed or more than a specific standard length and may connect the swiping manipulation having the specific reference speed or less or a reference length or less to the second playback type, depending on the user's request. Moreover, the computer may divide the reference speed or reference length and then may sequentially connect the divided results to subtypes of the second playback type.

Also, as another example, the computer sets a time point just before a balloon bursts as the reference time point by using a video, which indicates that the balloon bursts after the deformation that an air-filled balloon is dented as the balloon is pressed, as a basic video. The computer sets a section before the reference time point to a first event section, and sets a section after the reference time point to a second event section. As such, the computer sets the first playback type that plays a second event section continuously after the first event section is played, and the second playback type that plays the first section in forward and reverse directions. As described below, the computer connects the first playback type to a user manipulation having more than specific force touch intensity or more than a time length, at which a touch manipulation is entered, and connects the second playback type to a user manipulation having the specific force touch intensity or less or the time length or less that the touch manipulation is entered.

To generate a reactive video, a method of generating a basic video as a compressed video is not limited thereto, and various methods may be applied.

The computer performs a process for extracting the image frame or video section on a plurality of basic videos. In this way, the computer may minimize an image frame required in a process of producing a multi-reactive video by using a plurality of basic videos indicating that one object is moved.

Also, the computer divides a region within each frame for a plurality of frames included in a plurality of basic videos such that regions redundantly stored in a plurality of image frames are not stored redundantly.

For example, when generating a multi-reactive video by using a plurality of basic videos (e.g., a first basic video, a second basic video, and a third basic video) indicating that an index finger is moved differently, the computer extracts a background region excluding a finger, which is an object. Because the background region is a common portion in a plurality of videos for the movement of an index finger, the computer sets the extracted background region as a common region. At this time, the computer may extract and collect only a region, which is maintained as a background while a finger being an object does not appear in a plurality of basic videos, so as to be extracted as a background region. As another example, the computer generates a background image, in which a portion where the finger is positioned is filled, based on background information, which appears while an object is moved, and a surrounding video of a background. In this way, the computer may reduce a capacity for storing a portion included in every frame as a background.

Also, the computer reduces a data capacity by dividing and storing an object region (e.g., the user's hand) in a plurality of basic videos. For example, when only fingers are moved and a back of a hand is maintained at the same location in the first basic video and the second basic video, the computer separates the back of the hand and stores only one video corresponding to the back of a hand for specific one or more frames of the first basic video and the second basic video, or may store only videos corresponding to portions of fingers being moved. Afterward, when playing a multi-reactive video, the computer may output a video by extracting a plurality of regions (e.g. a background region, a region of the back of the hand, and a plurality of finger regions corresponding to each frame) necessary to play a specific basic video requested by the user's input manipulation.

The computer receives a multi-reactive video generation condition for the compressed video (S600). The multi-reactive video generation condition is a plurality of manipulation inputs corresponding to reactions capable of being generated in the compressed video. That is, the computer matches a plurality of user manipulations, which are to be connected to movements of various objects capable of being implemented through the compressed video, with each video section or frame, and then obtains the matched result.

An embodiment of the multi-reactive video generation condition refers to a condition that allows the basic video to react (i.e., providing an image frame corresponding to the user's touch manipulation in real time) by the user's touch manipulation. In this way, the user may visually perceive that an action in a video occurs (e.g., the movement of a manipulation object or object occurs depending on the user's touch manipulation) depending on the manipulation entered by him/her.

Besides, the computer performs a process of obtaining and compressing a plurality of basic videos for generating a multi-reactive video and then performs a process of connecting the user's input manipulation type to the multi-reactive video. For example, a computer connects each input manipulation of a user to a specific section video or one or more image frames within the compressed video. For example, in a process of generating a multi-reactive video, the computer connects the section video or image frame so as to be suitable for a location at which an input manipulation is provided, the type of the input manipulation, the intensity applied for a force touch, a pressing angle, a movement direction for a drag operation, or the like.

For example, the computer may match the manipulation of swiping a screen from right to left, which is entered by the user, with a section video indicating that a direction of a face that is an object is changed to the left in a state where the face faces the front, and then may connect a user manipulation of moving from right to left to the rotation of the face from the front to the left.

Also, for example, when a first basic video is a video indicating that the index finger is moved to the left with the other fingers folded, and a second basic video is a video indicating that the index finger is moved to the right, the computer obtains an input manipulation of touching an index finger region and dragging the index finger to the left from a creator client to match the input manipulation with the first section video, and obtains an input manipulation of touching the index finger region and dragging the index finger to the right to match the input manipulation with the second section video. The computer receives various input manipulations depending on the type of a basic video, matches and stores the various input manipulations.

Also, in an embodiment, the computer may be implemented to provide an image frame provided by the depth information change differently depending on a pressing method of an input manipulation. That is, the computer may be implemented such that different image frames are provided by the pressed angle, and thus the user may identify a reaction to which the pressing angle is actually reflected.

Moreover, in another embodiment, when a specific input manipulation satisfies a specific condition, a multi-reactive video generation condition means a condition that a specific portion included in a basic video is played (i.e., an action occurs). Also, in another embodiment, the multi-reactive video generation condition means a condition for generating a multi-reactive video such that a plurality of regions within a frame individually or simultaneously react through one basic video.

When the multi-reactive video generation condition is a condition for implementing a basic video as a multi-reactive video that responds depending on a user manipulation, a generation condition to be stored in a multi-reactive video generation file may be received in a different way depending on the type of the basic video.

In an embodiment, when the basic video is a video captured in a general manner, the computer receives data for setting a specific playback range and a region within the frame to implement a multi-reactive video. At this time, the computer may receive condition data from the user by executing a multi-reactive video generation file generation program.

In detail, the computer receives an input for specifying a specific playback range from the user. In other words, a plurality of detailed videos are stored in one file. When the computer generates a multi-reactive video indicating a movement to the desired location depending on the user's manipulation, a user may select frames from a specific start frame (i.e., the first frame of a time domain to be produced as a multi-reactive video) to a final frame (i.e., the last frame of a time domain to be produced as a multi-reactive video) of a basic video. When the condition matching a specific input manipulation is satisfied, the computer may play the selected frames.

Afterward, the computer receives a specific input manipulation to be connected to the entire region or specific region of the frame within the playback range from the user, or applies an input manipulation that matches the movement of the manipulation object by analyzing the movement of a manipulation object in the video. That is, the computer may receive or specify the input manipulation matching the movement of an object within the specified playback range.

In addition, various methods may be applied as a method of connecting the playback range (or a section video) of a basic video or a compressed video to the input manipulation.

In an embodiment of a method of connecting a playback range to a specific input manipulation, the computer may apply a method of generating a virtual layer in the entire region or a specific region of each frame within a specified playback range. The virtual layer may mean a layer that is capable of receiving a user input without visually appearing on a screen and is overlaid on the frame. That is, the computer obtains a condition (i.e., a time range in which the virtual layer will be generated, the number of frames in which the virtual layer will be generated, a range on the frame, or the like) for generating a virtual layer composed of the specific number of detailed cells on a frame, from the user. When playing a multi-reactive video, the computer provides the basic video with a virtual layer generated by dividing into the specific number of detailed cells based on the virtual layer generation condition included in the multi-reactive video generation file. The number of detailed cells into which the virtual layer is divided may be determined depending on the number of image frames, which are to be matched and which are included in the virtual layer generation condition. For example, when the user desires to generate a multi-reactive video such that 'n' frames are played (i.e., play manipulation) variably depending on the multi-reactive video generation condition (i.e., a virtual layer generation condition), the computer may divide a specific region into 'n' sub-cells.

Also, in another embodiment, when the basic video is a combination of a plurality of image frames that store image frames for each location of an object in space, the computer receives a condition setting for matching a specific frame with each point on a touch screen from the user.

In detail, the computer receives an input for setting a region, which is to be generated reactively in a plurality of image frames in the basic video, from the user. In an embodiment, the computer receives an input for setting the reaction-type region to the specific image frame, from the user. For example, the computer may extract and provide a specific image frame in the base video on a screen and may allow a user to assign a range of an object. The locations of the camera and object are fixed in the base video, and thus the computer may provide an arbitrary image frame and then may set the region of the object through a touch manipulation. In addition, in another embodiment, the computer extracts an object image, which is identically present in a plurality of frames in the basic video, from the user and receives and executes a command for implementing the extracted result as a reactive generation region. Moreover, in another embodiment, the computer tracks the movement of a manipulation object (e.g., a hand) and then receives a command for implementing a range including a movement path of the manipulation object (e.g., a hand) as a reactive generation region from the user.

Afterward, the computer receives a density setting to be entered through a touch manipulation from the user. That is, the computer receives the number of frames to be matched with the reactive region. For example, when the basic video consists of L (the number of time frames)×M (the number of event frames)×N (the number of depth frames), a frame density less than or equal to "L×M×N" may be applied to the reactive generation region. As such, when playing a multi-reactive video, the computer divides the reactive generation region based on the set density, matches an image frame corresponding to a plurality of sub-cells constituting the reactive generation region with each sub-cell, and implements the multi-reactive video.

Also, in another embodiment, when a frame corresponding to a user manipulation is set to be provided, the computer receives a specific playback condition from the user. The playback condition means that playback is performed by continuing playback or moving the playback point to a specific time point when the condition is satisfied.

For example, the computer receives a specific input condition. That is, the computer receives a push manipulation for a specific point, a drag manipulation for a specific range, or a pinch manipulation for a specific range. After that, the computer receives a playback condition that will occur when the corresponding input condition is satisfied. The computer may be configured to play (i.e., move to a specific image frame and then play the specific image frame or play a specific section from a first image frame to a second image frame) a specific playback range. When an input condition is satisfied, the computer may provide a specific link. In addition, the computer may be configured to combine or replace all regions or some regions within a frame of a specific playback range with another video.

Also, in another embodiment, the computer provides one screen with a plurality of multi-reactive videos and forms a connection relationship between multi-reactive videos. For example, when forming the connection relationship between two multi-reactive videos, the computer forms the final multi-reactive video in which the first multi-reactive video and the second multi-reactive video are combined to each other. When a user manipulation for a specific multi-reactive video occurs, not only a reaction (i.e., an action) occurs in the corresponding multi-reactive video, but also an action according to the connection relationship occurs in the other multi-reactive video. In detail, in the case where the first multi-reactive video expresses the user's face image, and the second multi-reactive video expresses only some skin regions included in the user's face, when the computer repeatedly receives a drag manipulation such as applying color cosmetics to the second multi-reactive video from the user, the computer implements an action of skin makeup (e.g., sequentially play videos indicating that a face image without color makeup is changed to a face image with color makeup) by playing the first multi-reactive video connected to the second multi-reactive video. Moreover, the type of an action generated in a first multi-reactive video and a second multi-reactive video may be different depending on the type of a manipulation input to the second multi-reactive video.

However, the number of multi-reactive videos capable of forming a connection relationship is not limited thereto, and a connection relationship with a plurality of multi-reactive video may be formed in one multi-reactive video. For example, the computer may provide 16 individual multi-reactive videos into 16 divisions in one screen, and may form the connection relationship between respective multi-reactive videos.

The computer sets a multi-reactive video generation condition (e.g., an input condition and playback condition for a multi-reactive video) in various manners. In an embodiment, the computer directly receives a condition function for implementing the reaction in a multi-reactive video. That is, the computer may directly receive a function code that implements the response from the user. For example, when a frame set including a plurality of videos is provided on a screen (i.e., when the first multi-reactive video and the second multi-reactive video are combined with each other), the computer receives two multi-reactive video functions from the user.

Moreover, in another embodiment, the computer implements a multi-reactive video by directly inputting a multi-reactive video generation condition entered from the user into the basic video by using a multi-reactive video generation file implementing program. The computer launches the multi-reactive video generation file implementing program and may load a specific basic video by the user's manipulation. Afterward, the computer receives a manipulation corresponding to a generation condition (i.e., an input condition, a playback condition, or the like) to be implemented with a multi-reactive video from the user, and a multi-reactive video generating program or generating application generates a function for implementing the corresponding generation condition.

As will be described later, when a multi-reactive video generation file that is played together with one or more basic videos is present separately, the computer stores the generation condition entered from the user in the multi-reactive video generation file through the generation file implementing program. For example, the computer stores a multi-reactive video implementing function code corresponding to the generation condition as a separate file. The computer may receive a manipulation (e.g., a touch manipulation, a mouse manipulation, or the like) on the basic video and may record the corresponding condition (e.g., an action type, a playback range in which an action is input, an action to be executed when a condition is satisfied, or the like) on the multi-reactive video generation file.

Moreover, in another embodiment, in the case where the multi-reactive video generation condition is a condition that a specific action (e.g., a video of specific portion included in the basic video) is played when a specific input manipulation satisfies a specific condition, the computer receives a specific input manipulation type, an action type (e.g., a playback time point to be moved within the basic video) generated when a condition is satisfied, and a condition value to be satisfied from the user.

Moreover, in another embodiment, when the multi-reactive video generation condition is a condition for generating a multi-reactive video such that a plurality of regions within a frame react individually or simultaneously through one basic video, the user sets a playback range, which is to be divided or cropped by the computer, and sets a region, which is to be divided or cropped within the corresponding range by the computer. Afterward, the computer receives video information, which is to be individually played in a region to be divided or cropped, from the user. For example, when the basic video is a video indicating that water is sequentially poured into cups positioned on the left and right, the frame may be divided based on a dividing line where the two cups are divided, and both the divided frames may be independently implemented reactively. In this way, various multi-reactive videos may be implemented with one basic video, thereby reducing the capacity of the multi-reactive video, and simplifying the capture of the basic video for implementing a multi-reactive video.

The computer generates a multi-reactive video by applying the generation condition to the compressed video (S800). The computer applies a multi-reactive video generation condition and stores multi-reactive video data.

In an embodiment, the computer generates a final multi-reactive video file by reflecting the result of compressing a plurality of basic videos and obtaining an input manipulation for each basic video. That is, the computer merges a plurality of regions compressed depending on the user's input manipulation to build a file in a form in which a specific action is capable of being played in a multi-reactive video.

Moreover, in another embodiment, when the computer directly receives the multi-reactive video generation condition from the user in a form of a function, the computer stores a function form input in the multi-reactive video generation file, which is used together with one or more basic videos, as it is. In another embodiment, when directly receiving a specific input manipulation to the basic video by using a multi-reactive video generation file production program (or generation program) from the user, the computer generates and stores a function corresponding to the corresponding input manipulation. In other words, in a multi-reactive video generation condition entered for the basic video by the user, the computer may extract data such as a frame, a range within the corresponding frame, and a response (i.e., an action) type and may store the extracted data in a form of a function.

In this way, the user may easily implement a specific video as a multi-reactive video by using the multi-reactive video generation file in which the multi-reactive video generation condition is stored. In other words, when the user desires to play a basic video itself, the basic video except for the multi-reactive video generation file may be just played. When the user desires to implement a multi-reactive video, the multi-reactive video may be played by playing a basic video file and the multi-reactive video generation file together.

Moreover, the method further includes generating, by the computer, a storage format of the stack structure based on a relationship between section videos in a compressed video. For example, the computer may build a frame or a plurality of regions, which are obtained in a compression process, so as to have a stack structure. That is, the computer generates a multi-reactive video file by stacking a plurality of regions, which are generated for video compression within a frame range (i.e., two-dimensional range) of the basic video, in one or more stacks.

In detail, when an input manipulation from the user is applied, the computer sets a set of locations, at each of which a specific extraction region needs to be provided, to a display range of the corresponding extraction region. For example, a background region needs to be displayed in all locations at each of which an input manipulation is provided, and thus the computer sets the entire frame to the display range of the background region. Moreover, the computer may store a change or according to force touch intensity at each location or over time through stacks.

Moreover, when implementing a plurality of operations at different locations within one multi-reactive video, the computer forms a stack for each operation implemented at a plurality of locations. In this way, when the user enters an input manipulation for implementing a plurality of operations at once while a multi-reactive video is played, the computer may output a video, to which a movement according to a plurality of input manipulations are reflected at once, by extracting and merging extraction regions from a stack, to which each input manipulation is applied.

For example, for a multi-reactive video including a first manipulation of opening a mouth and a second manipulation of moving food into the mouth, when the user enters the first input manipulation (e.g., a manipulation of touching upper and lower lip locations with two fingers and opening the mouth) for opening the mouth and the second manipulation of touching food and dragging the food towards the mouth at the same time, the computer merges a first extraction region, which is extracted from a stack at a location where a manipulation of opening the mouth is entered, merges a second extraction region extracted from a stack at a location where a manipulation of moving food is entered, and generates an output video.

In this way, the computer may provide output videos different depending on input levels of the first input manipulation and the second input manipulation. For example, when only the first input manipulation is entered, the computer provides an output video indicating that the mouth is opened. When only the second input manipulation is entered, the computer provides an output video indicating that the food is moved towards the mouth. When the first input manipulation and the second input manipulation are entered simultaneously, the computer provides an output video indicating that the food is entered into the mouth while the mouth is opened. Moreover, the computer may provide different output videos depending on a pattern to which the first input manipulation and the second input manipulation are applied.

Figure 5:
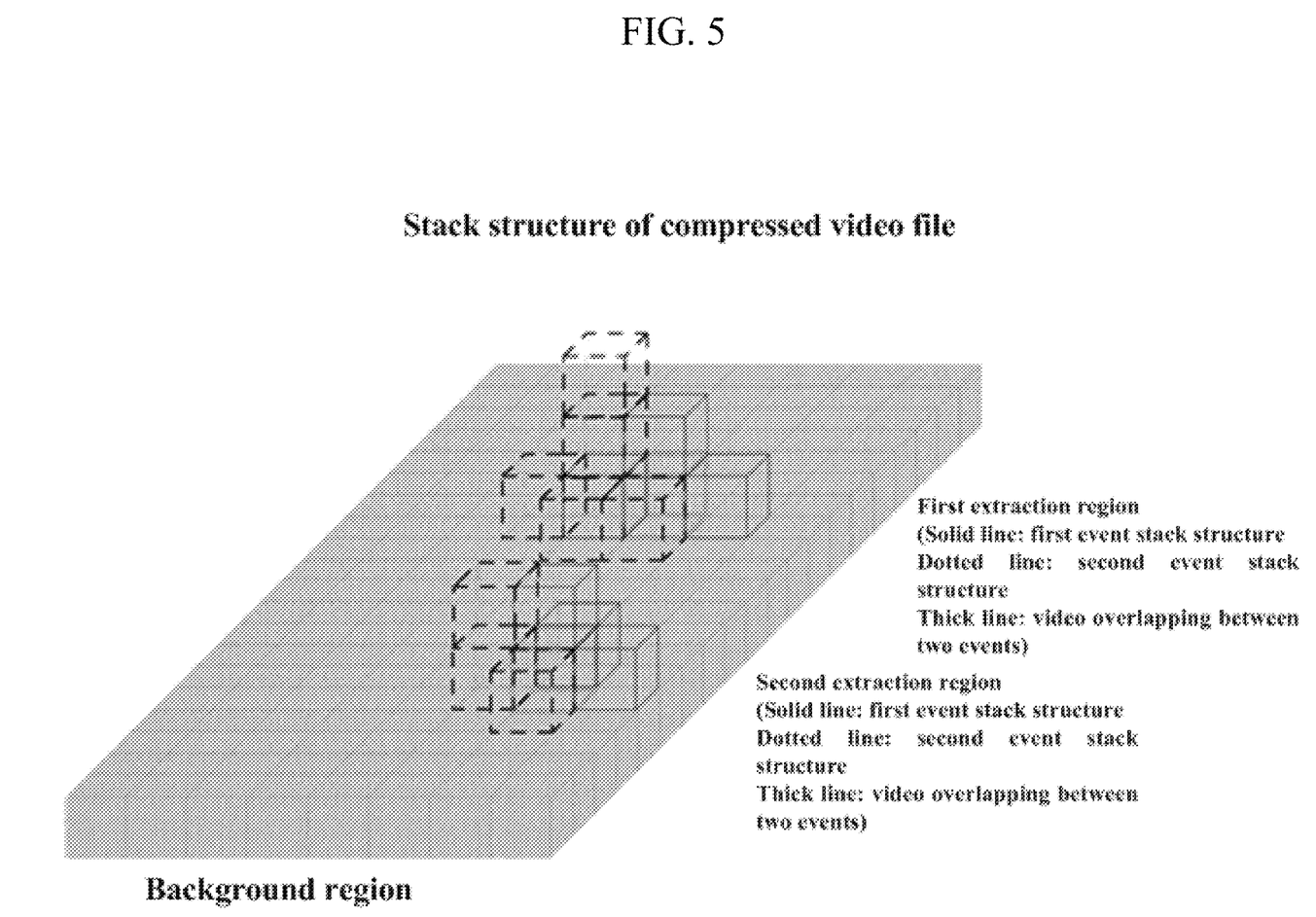
FIG. 5 is an exemplary view illustrating a stack structure of a compressed video, according to an embodiment of the inventive concept.

Furthermore, as illustrated in FIG. 5, each extraction region (a first extraction region and a second extraction region) may include a plurality of stacks for different events. For example, a first stack expressed by a solid line and a second stack expressed by a dotted line may be included in each extraction region. The computer may be implemented to determine a stack, which is executed, from among the first stack and the second stack based on a location where the first manipulation is entered from the user into each extraction region.

Also, as illustrated in FIG. 5, a first event and a second event within each extraction region may include overlapping pixels. The computer may store only one of overlapping pixels among a stack for the first event and a stack for the second event. Even though the compressed video includes only a piece of data for the overlapping pixels within a specific extraction region, the stack of one of the first event and the second event may be determined depending on the user's next manipulation (e.g., a change of movement direction of a touch manipulation or a change of applied pressure strength). In this way, the computer may generate the compressed video with minimal data.

Hereinafter, a method in which a user employs a multi-reactive video will be described.

According to an embodiment of the inventive concept, a method for playing and using a multi-reactive video includes loading, by a client, a specific multi-reactive video, receiving a user manipulation for the multi-reactive video, and calculating and outputting a reaction according to the user manipulation (a response outputting step).

In the response outputting step, the computer (i.e., a client device that plays a multi-reactive video) calculates a movement direction, a speed, an input angle to a screen, an input time length, pressure strength, or the like of the touch manipulation applied to a display.

For example, when a user (hereinafter referred to as a "second user") playing a multi-reactive video vertically applies pressure to the screen of a client (hereinafter referred to as a "second client") playing a multi-reactive video, or when the user obliquely applies pressure to the screen, the user may select and provide different sub-cells. When a real object is pressed in a vertical direction, the real object is dented in the vertical direction. When a real object is pressed in an oblique direction, the real object is dented in the oblique direction. As such, to provide realism to the second user even in the reactive video, there is a need to implement another movement of the object by playing different image frames depending on a pressing method, even when pressure is applied to the same point.

To this end, the second client may distinguish between pressurization methods in various manners. For example, the second client may determine a pressurization method based on a cross-sectional shape (e.g., the number of pixels in contact with a finger and the distribution of pixels in contact with a finger) of a finger touching a screen.

Moreover, for example, the second client may determine the pressurization method based on the pressure distribution applied on a screen. That is, the second client may determine the pressurization method, in which pressure is being applied to the screen by the user, depending on whether the overall pressure intensity applied to a range where a touch manipulation is entered is uniform, or whether the applied pressure intensity is different for each portion.

Moreover, for example, when pressing the screen by using a manipulation object (e.g., a finger), the second client may determine a pressing direction by measuring a minute movement of the finger on the screen.

When the pressurization method is determined to obliquely press an object, the second client provides a frame at a location in 2D space, in which a pressure direction in which pressure is applied is changed as depth information is changed. In detail, when the screen is pressed in an oblique direction, the second client provides an image frame at a point, at which the second user's finger is contacted, and then extracts and provides sub-cells corresponding to an extension line in a direction in which the finger is tilted as the pressure applied to the screen increases.

Moreover, according to another embodiment of the inventive concept, when a playback request for the basic video is received, the method further includes loading, by the computer, a multi-reactive video generation file together to implement a multi-reactive video. For example, when the multi-reactive video generation file is included in a folder where the basic video is stored or the corresponding multi-reactive video generation file in a database is matched, the computer may play the multi-reactive video generation files together when playing the basic video so as to implement the multi-reactive video.

Moreover, according to another embodiment of the inventive concept, the method further includes obtaining, by the computer, data such as the number of manipulations entered into the multi-reactive video, a manipulation range in a frame, and pressure intensity applied in the frame from the user. For example, the computer records input manipulation details entered into the multi-reactive video by the multi-reactive video generation file. In this way, companies using the multi-reactive video for marketing may identify the marketing effect of an object in the multi-reactive video.

Furthermore, in another embodiment, when the user enters an input manipulation while employing the multi-reactive video, the computer stores an input manipulation pattern provided by the user in the specific multi-reactive video. Besides, the computer may match and store the output video data according to the input manipulation with the input manipulation pattern together. In this way, the computer may grasp the user's propensity by inputting each user's input manipulation and output video data to deep learning. For example, the computer may grasp the degree of interest in a specific object, or the like through an object in the multi-reactive video, to which the input manipulation entered by user is applied, or a pattern of the input manipulation entered by the user.

In detail, an interaction data analyzing method for understanding the user's act based on a user input manipulation entered into the multi-reactive video is described as follows. For example, in content associated with a cat, the computer may determine whether the user is touching the object with affection for the object, or whether the user is touching the object with rejection or negative psychology by distinguishing between 'repeatedly drawing a trajectory while slowly applying a weak force by using an object' and 'repeatedly drawing a trajectory while quickly applying a strong force with a short time difference'. In this way, the computer may grasp the user's intent and desire. Furthermore, hyper-personalization may be implemented by providing a user manipulation pattern, to which each user's characteristic is reflected, and thus the computer may use the user manipulation pattern (i.e., interaction data) as identification data (e.g., a manipulation pattern fingerprint) capable of identifying the user. Moreover, it may be used as a gesture-type action ripple including the user's emotions.

Besides, in another embodiment, the method may further include providing, by the computer, reactive video content depending on a user's request. The computer receives pieces of information about interactive sections in video data from meta data and converts the pieces of information into a multi-reactive video. The computer may output different reactions depending on the type (e.g., a difference in an angle at which a user manipulation is applied, or the like) of a user manipulation entered into multi-reactive video data. Moreover, the computer may grasp the meaning of the action by analyzing and predicting a plurality of trajectories (e.g., a user's manipulation form, manipulation type, or the like) of objects interacting with content in real time. In addition, the computer may match the corresponding event to a reaction form corresponding to the meaning and then may output the matched result. Moreover, the computer may rearrange the mapping data in real time depending on an event according to the reaction form.

The multi-reactive video generation file generating method according to an embodiment of the inventive concept may be implemented by a program (or an application) and may be stored in a medium such that the program is executed in combination with a computer being hardware.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers, which the computer may access, or in various recording media on the computer of the user. Further, the media may be distributed in computer systems connected over a network such that codes readable by the computer are stored in a distributed manner.

First, various actions (i.e., reactions) may be applied as the multi-reactive video generation file is played with a general video or a combination of a plurality of image frames.

Second, unlike a conventional media simply limited by a time axis, it is possible to provide a user with a multi-reactive video, which is variously output depending on an event as a specific condition is set for a video through a multi-reactive video generation file, it is possible to provide a user with a multi-reactive video to which various events is applied.

Third, various actions may be implemented based on a single captured image by applying image segmentation or cropping to a video frame.

Fourth, it is possible to grasp a user's reaction to a video by recording manipulation details for a specific user's video through a multi-reactive video generation file. For example, it is possible to grasp the number of touch manipulations to the user's multi-reactive video, a frame in which a touch manipulation has been performed, and an object in the frame, or the like.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

The inventive concept has the following various effects.

First, unlike a conventional media simply limited by a time axis, it is possible to provide a user with a multi-reactive video, which is variously output depending on an event, by applying various playback conditions according to a user's manipulation to a multi-reactive video. In this way, as repeated attempts for identifying various results of users are induced, it is possible to increase a user's interest in an object (i.e., a thing) included in a multi-reactive video. In other words, as a specific condition is set for a video through a multi-reactive video generation file, it is possible to provide a user with a multi-reactive video to which various events is applied.

Second, various actions (i.e., reactions) may be applied as the multi-reactive video generation file is played with a general video or a combination of a plurality of image frames.

Third, various actions may be implemented based on a single captured image by applying image segmentation or cropping to a video frame.

Fourth, it is possible to grasp a user's reaction to a video by recording manipulation details for a specific user's multi-reactive video. For example, it is possible to grasp the object of interest and the degree of interest of a user and to grasp a user interest in the user, by grasping the number of touch manipulations to the user's multi-reactive video, a frame in which a touch manipulation has been performed, and an object in the frame, or the like.

Besides, it is possible to maximize the sense of reality and to generate rich experience content capable of being directly interacted with in a variety of manners by fully including various properties (e.g., the action of gravity and force, weight, a resistance value, a surface texture in both environmental and object aspects, elasticity, density, a size, a shape, a distance from an object, and sound) of real-world phenomena while each event is coupled to conditions of various input methods.

Moreover, according to an embodiment of the inventive concept, it is possible to grasp a user's intent and needs by accumulating and analyzing the user's interaction data for multi-reactive video content by using the generated multi-reactive video, and to perform hyper-personalization for grasping the user's characteristics based on data analysis results.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A multi-reactive video generating method, the method comprising:
    obtaining, by a computer, a basic video, wherein the basic video is an original video including a movement of an object to be reactively implemented depending on manipulation of a user;
    generating, by the computer, a compressed video based on the basic video, wherein the compressed video includes only a movement of an object to be reactively implemented depending on the manipulation of the user;
    receiving, by the computer, a multi-reactive video generation condition, wherein the multi-reactive video generation condition is a plurality of manipulation inputs corresponding to reactions capable of being generated in the compressed video; and
    generating a multi-reactive video by applying the generation condition to the compressed video,
    wherein the generating of the compressed video includes:
    when the basic video includes a first event section and a second event section, which have appearance changes different from each other before and after a specific reference time point, setting a first playback type, in which the first event section is played in a forward direction and then the second event section is continuously played, and a second playback type, in which the first event section is played in the forward direction and then is played in a reverse direction, and
    wherein the receiving of the multi-reactive video generation condition includes:
    connecting the first playback type to the second playback type by dividing a same user manipulation type into a first manipulation and a second manipulation based on specific reference manipulation intensity, a reference movement length, a reference manipulation speed, or a reference manipulation time length.

2. The method of claim 1, wherein the generating of the compressed video includes:
    deleting an image frame, which is not implemented reactively, from the basic video by dividing a video section or recognizing a similarity between image frames.

3. The method of claim 1, wherein the generating of the compressed video includes:
    when a first basic video and a second basic video, which include the same object as each other, include a movement for a path having the same object,
    storing, by the computer, a redundant section video included in one of the first basic video and the second basic video by extracting a section video including a movement of a same path from the first basic video and the second basic video.

4. The method of claim 1, wherein the generating of the compressed video includes:
    when the basic video includes a first section video indicating a movement from a first location to a second location and a second section video indicating a movement from the second location to the first location,
    storing, by the computer only the first section video in the compressed video; and
    setting the first section video to be played in a reverse direction when a user manipulation of generating a movement of the object from the second location to the first location is entered.

5. The method of claim 1, wherein the generating the multi-reactive video includes:
    when a specific reactive generation condition is satisfied by a user manipulation, setting a specific section video within the compressed video to be output in a specific playback method.

6. The method of claim 1, wherein the generating the multi-reactive video includes:
    connecting a plurality of multi-reactive videos such that a change in a second multi-reactive video is output depending on a user manipulation entered into a first multi-reactive video,
    wherein the first multi-reactive video and the second multi-reactive video are set to be simultaneously output on a screen.

7. A non-transitory computer-readable recording medium storing a multi-reactive video generating program, configured to be coupled to computer hardware, the program includes instructions to execute the method of claim 1.

8. A multi-reactive video generating method, the method comprising:
    obtaining, by a computer, a basic video, wherein the basic video is an original video including a movement of an object to be reactively implemented depending on manipulation of a user;
    generating, by the computer, a compressed video based on the basic video, wherein the compressed video includes only a movement of an object to be reactively implemented depending on the manipulation of the user;
    receiving, by the computer, a multi-reactive video generation condition, wherein the multi-reactive video generation condition is a plurality of manipulation inputs corresponding to reactions capable of being generated in the compressed video; and
    generating a multi-reactive video by applying the generation condition to the compressed video,
    wherein the generating of the compressed video includes:
    when a background region in which a change does not occur is included in a plurality of image frames included in the entire basic video or a specific section video within the basic video, extracting, by the computer, the background region from the basic video or the section video; and
    including the background region within only the basic video or an initial frame of the section video and then storing only one or more extraction regions in an image frame, and
    wherein the extraction regions are regions in which a change in an object movement occurs in the basic video.

9. The method of claim 8, wherein the generating of the compressed video includes:
    sequentially accumulating, by the computer, an extraction region of each image frame, which is implemented reactively, at each location in a stack structure from an initial frame including both the background region and the extraction regions and generating a compressed video file, and wherein the generating the multi-reactive video includes:
connecting and storing a user manipulation to each extraction region on the stack structure.

10. The method of claim 9, wherein, when an extraction region stack is formed in a plurality of regions within an image frame, the multi-reactive video is output by simultaneously extracting a plurality of extraction regions according to a plurality of user manipulations thus input and combining the extracted plurality of extraction regions with the background region.

11. The method of claim 8, wherein the generating of the compressed video includes:
deleting an image frame, which is not implemented reactively, from the basic video by dividing a video section or recognizing a similarity between image frames.

12. The method of claim 8, wherein the generating of the compressed video includes:
when a first basic video and a second basic video, which include the same object as each other, include a movement for a path having the same object,
storing, by the computer, a redundant section video included in one of the first basic video and the second basic video by extracting a section video including a movement of a same path from the first basic video and the second basic video.

13. The method of claim 8, wherein the generating of the compressed video includes:
when the basic video includes a first section video indicating a movement from a first location to a second location and a second section video indicating a movement from the second location to the first location,
storing, by the computer only the first section video in the compressed video; and
setting the first section video to be played in a reverse direction when a user manipulation of generating a movement of the object from the second location to the first location is entered.

14. The method of claim 8, wherein the generating the multi-reactive video includes:
when a specific reactive generation condition is satisfied by a user manipulation, setting a specific section video within the compressed video to be output in a specific playback method.

15. The method of claim 8, wherein the generating the multi-reactive video includes:
connecting a plurality of multi-reactive videos such that a change in a second multi-reactive video is output depending on a user manipulation entered into a first multi-reactive video,
wherein the first multi-reactive video and the second multi-reactive video are set to be simultaneously output on a screen.

16. A non-transitory computer-readable recording medium storing a multi-reactive video generating program, configured to be coupled to computer hardware, the program includes instructions to execute the method of claim 8.

* * * * *

UNITED STATES PATENT AND TRADEMARK OFFICE
CERTIFICATE OF CORRECTION

| | | |
|---|---|---|
| PATENT NO. | : 11,681,426 B2 | Page 1 of 1 |
| APPLICATION NO. | : 17/508506 | |
| DATED | : June 20, 2023 | |
| INVENTOR(S) | : Chul Woo Lee | |

It is certified that error appears in the above-identified patent and that said Letters Patent is hereby corrected as shown below:

On the Title Page

Item (71) Applicant:
Chui Woo Lee, Seoul (KR)
Should be corrected to be:
Chul Woo Lee, Seoul (KR)

Item (72) Inventor:
Chui Woo Lee, Seoul (KR)
Should be corrected to be:
Chul Woo Lee, Seoul (KR)

Signed and Sealed this
Twenty-second Day of August, 2023

Katherine Kelly Vidal
*Director of the United States Patent and Trademark Office*